United States Patent
Nagao et al.

(10) Patent No.: US 10,783,389 B2
(45) Date of Patent: Sep. 22, 2020

(54) SYSTEMS AND METHODS FOR AVOIDING MISRECOGNITION OF TRAFFIC SIGNS AND SIGNALS BY HACKING

(71) Applicant: DENSO International America, Inc., Southfield, MI (US)

(72) Inventors: Satoshi Nagao, West Bloomfield, MI (US); Ameer Kashani, Southfield, MI (US)

(73) Assignee: DENSO International America, Inc., Southfield, MI (US)

( * ) Notice: Subject to any disclaimer, the term of this patent is extended or adjusted under 35 U.S.C. 154(b) by 170 days.

(21) Appl. No.: 16/052,806

(22) Filed: Aug. 2, 2018

(65) Prior Publication Data

US 2020/0042813 A1 Feb. 6, 2020

(51) Int. Cl.

| | |
|---|---|
| *B60R 11/00* | (2006.01) |
| *G06K 9/03* | (2006.01) |
| *G08G 1/0962* | (2006.01) |
| *G08G 1/056* | (2006.01) |
| *G06K 9/00* | (2006.01) |
| *G06K 9/62* | (2006.01) |
| *G05D 1/00* | (2006.01) |
| *G08G 1/04* | (2006.01) |

(52) U.S. Cl.
CPC ............ *G06K 9/03* (2013.01); *G05D 1/0061* (2013.01); *G05D 1/0088* (2013.01); *G06K 9/00818* (2013.01); *G06K 9/6264* (2013.01); *G08G 1/04* (2013.01); *G05D 2201/0212* (2013.01)

(58) Field of Classification Search
CPC . G06K 9/03; G06K 9/00; G01C 23/08; B60R 11/00; G06N 99/00; H04N 5/23229; G08G 1/056; G08G 1/0962
See application file for complete search history.

(56) References Cited

U.S. PATENT DOCUMENTS 9,784,835 B1 * 10/2017 Droz ..................... G01S 17/08
2001/0051853 A1   12/2001 Evans
(Continued)

FOREIGN PATENT DOCUMENTS

| CN | 104951745 A | * | 9/2015 | ......... H04N 5/23229 |
| CN | 106515602 A | * | 3/2017 | ............ B60R 11/00 |
| WO | WO-2016140268 A1 | | 9/2016 | |

*Primary Examiner* — Yuri Kan
(74) *Attorney, Agent, or Firm* — Harness, Dickey & Pierce, P.L.C.

(57) ABSTRACT

Systems and methods are disclosed and include receiving, using an electronic control module of a vehicle, image data from a camera system. The method includes identifying, using the electronic control module, a traffic sign based on the image data and information from a training database. The method includes determining, using the electronic control module, whether the traffic sign is correct based on a matching of the traffic sign and an entry of at least one of (i) a traffic rules database, (ii) a traffic customs database, (iii) a map information database, and (iv) a global positioning system (GPS) information database. The method includes identifying, in response to determining that the traffic sign is correct, a vehicle action from a vehicle action database corresponding to the traffic sign. The method includes outputting, in response to validating the vehicle action, a signal to a vehicle control module corresponding to the vehicle action.

16 Claims, 5 Drawing Sheets

(56) References Cited

U.S. PATENT DOCUMENTS

| | | |
|---|---|---|
| 2003/0016147 A1 | 1/2003 | Evans |
| 2009/0070031 A1 | 3/2009 | Ginsberg |
| 2009/0082950 A1 | 3/2009 | Vorona |
| 2009/0165135 A1 | 6/2009 | Lomont et al. |
| 2010/0063734 A1 | 3/2010 | Kumar |
| 2012/0150778 A1 | 6/2012 | Kim et al. |
| 2014/0112532 A1* | 4/2014 | Faber ................. B60R 1/00 382/103 |
| 2014/0215621 A1 | 7/2014 | Xaypanya et al. |
| 2014/0350837 A1 | 11/2014 | Galbas et al. |
| 2016/0275792 A1* | 9/2016 | Takiguchi ............. G01C 21/30 |
| 2016/0275793 A1* | 9/2016 | Yokochi ............. G08G 1/09626 |
| 2016/0343253 A1* | 11/2016 | Imai ..................... G08B 5/22 |
| 2016/0379486 A1 | 12/2016 | Taylor |
| 2017/0031015 A1 | 2/2017 | Mei et al. |
| 2017/0103653 A1 | 4/2017 | Satomura |
| 2017/0160743 A1 | 6/2017 | Schweikl |
| 2017/0169208 A1 | 6/2017 | Jantz et al. |
| 2018/0024900 A1 | 1/2018 | Premerlani et al. |
| 2018/0058860 A1 | 3/2018 | Matsumoto et al. |
| 2019/0325349 A1* | 10/2019 | Zhang ................. G06N 20/00 |

\* cited by examiner

SYSTEMS AND METHODS FOR AVOIDING MISRECOGNITION OF TRAFFIC SIGNS AND SIGNALS BY HACKING

FIELD

The present disclosure relates to systems and methods for avoiding misrecognition of traffic signs and signals by hacking.

BACKGROUND

This section provides background information related to the present disclosure and is not necessarily prior art.

Autonomous vehicles, which are vehicles that can operate without human input, are capable of sensing and determining characteristics of the surrounding environment using a variety of sensor systems, such as a camera system, a radar system, a sonar system, an ultrasonic system, a dedicated short range communication (DSRC) system, and a LIDAR system. As an example, based on image data obtained by a camera system of the vehicle, an electronic control module of the vehicle may execute various object detection algorithms, such as a traffic sign and signal identification algorithm. However, autonomous vehicles may include physical vulnerabilities that subject autonomous vehicles to malicious attacks. Moreover, malicious attacks may negatively affect the accuracy and/or functionality of the various object detection algorithms.

SUMMARY

This section provides a general summary of the disclosure, and is not a comprehensive disclosure of its full scope or all of its features.

A method is disclosed and includes receiving, using an electronic control module of a vehicle, image data from a camera system. The electronic control module includes at least one processor that is configured to execute instructions stored in a nontransitory medium. The method includes identifying, using the electronic control module, a traffic sign based on the image data and information from a training database. The method includes determining, using the electronic control module, whether the traffic sign is correct based on a matching of the traffic sign and an entry of at least one of (i) a traffic rules database, (ii) a traffic customs database, (iii) a map information database, and (iv) a global positioning system (GPS) information database. The method includes identifying, in response to determining that the traffic sign is correct, a vehicle action from a vehicle action database corresponding to the traffic sign. The method includes outputting, in response to validating the vehicle action, a signal to a vehicle control module corresponding to the vehicle action.

In some embodiments, the method further comprises, in response to determining that the traffic sign is incorrect, generating, using the electronic control module, an alert that indicates the vehicle was modified by an unauthorized device.

In some embodiments, the method further comprises, in response to determining that the traffic sign is incorrect, deactivating, using the electronic control module, at least a portion of autonomous functions of the vehicle.

In some embodiments, the method further comprises, in response to the vehicle being serviced based on a modification by the unauthorized device, activating at least the portion of the autonomous functions of the vehicle.

In some embodiments, the signal is configured to activate at least one of an engine control module, a transmission control module, an antilock brake control module, a suspension control module, a steering control module, a traction control module, a lighting control module, and a cluster control module.

In some embodiments, the electronic control module is configured to execute various machine learning algorithms using a plurality of cascaded layers that process image data obtained by the camera system.

In some embodiments, determining whether the traffic sign matches the entry of the traffic rules database further comprises comparing image data to information of the entry indicating physical characteristics of the traffic sign; and in response to the image data matching each of the physical characteristics of the traffic sign, determining that the traffic sign matches the entry of the traffic rules database.

In some embodiments, determining whether the traffic sign matches the entry of the traffic customs database further comprises obtaining location information associated with the vehicle; determining whether the entry of the traffic customs database corresponding to the location information exists; and in response to determining the entry of the traffic customs database corresponding to the location information exists, determining whether the entry of the traffic customs database indicates that the traffic sign is associated with a user-defined rule.

In some embodiments, determining whether the traffic sign matches the entry of the map information database further comprises: obtaining location information associated with the vehicle; identifying the entry of the map information database corresponding to the location information; and determining whether the identified entry indicates that the traffic sign is associated with the location information.

In some embodiments, determining whether the traffic sign matches the entry of the GPS information database further comprises: obtaining GPS coordinates associated with the vehicle; identifying the entry of the GPS information database corresponding to the GPS coordinates; and determining whether the identified entry indicates that the traffic sign is associated with the GPS coordinates.

A system is disclosed and includes an electronic control module of a vehicle, wherein the electronic control module includes at least one processor that is configured to execute instructions stored in a nontransitory medium. The instructions include receiving, using the electronic control module, image data from a camera system. The instructions include identifying, using the electronic control module, a traffic sign based on the image data and information from a training database. The instructions include determining, using the electronic control module, whether the traffic sign is correct based on a matching of the traffic sign and an entry of at least one of (i) a traffic rules database, (ii) a traffic customs database, (iii) a map information database, and (iv) a global positioning system (GPS) information database. The instructions include identifying, in response to determining that the traffic sign is correct, a vehicle action from a vehicle action database corresponding to the traffic sign. The instructions include outputting, in response to validating the vehicle action, a signal to a vehicle control module corresponding to the vehicle action.

In some embodiments, the instructions include, in response to determining that the traffic sign is incorrect, generating, using the electronic control module, an alert that indicates the vehicle was modified by an unauthorized device.

In some embodiments, the instructions include, in response to determining that the traffic sign is incorrect, deactivating, using the electronic control module, at least a portion of autonomous functions of the vehicle.

In some embodiments, the instructions include, in response to the vehicle being serviced based on a modification by the unauthorized device, activating at least the portion of the autonomous functions of the vehicle.

In some embodiments, the signal is configured to activate at least one of an engine control module, a transmission control module, an antilock brake control module, a suspension control module, a steering control module, a traction control module, a lighting control module, and a cluster control module.

In some embodiments, the electronic control module is configured to execute various machine learning algorithms using a plurality of cascaded layers that process image data obtained by the camera system.

In some embodiments, determining whether the traffic sign matches the entry of the traffic rules database further comprises comparing image data to information of the entry indicating physical characteristics of the traffic sign; and in response to the image data matching each of the physical characteristics of the traffic sign, determining that the traffic sign matches the entry of the traffic rules database.

In some embodiments, determining whether the traffic sign matches the entry of the traffic customs database further comprises obtaining location information associated with the vehicle; determining whether the entry of the traffic customs database corresponding to the location information exists; and in response to determining the entry of the traffic customs database corresponding to the location information exists, determining whether the entry of the traffic customs database indicates that the traffic sign is associated with a user-defined rule.

In some embodiments, determining whether the traffic sign matches the entry of the map information database further comprises obtaining location information associated with the vehicle; identifying the entry of the map information database corresponding to the location information; and determining whether the identified entry indicates that the traffic sign is associated with the location information.

In some embodiments, determining whether the traffic sign matches the entry of the GPS information database further comprises obtaining GPS coordinates associated with the vehicle; identifying the entry of the GPS information database corresponding to the GPS coordinates; and determining whether the identified entry indicates that the traffic sign is associated with the GPS coordinates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
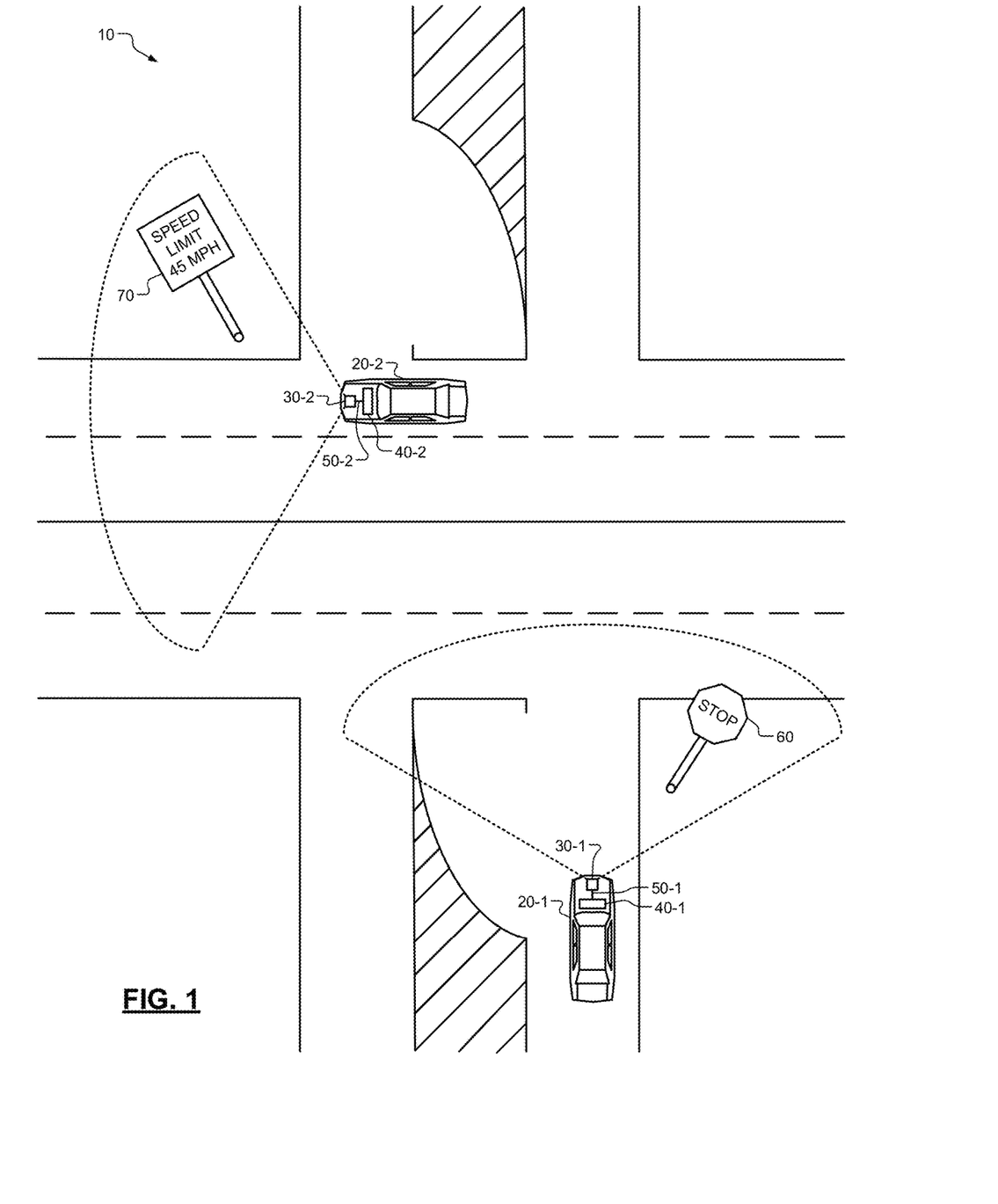
FIG. 1 illustrates an example roadway system according to the present disclosure.

With reference to FIG. 1, an example illustration of a roadway system 10 is shown. The roadway system 10 may include vehicles 20-1, 20-2, (collectively referred to as vehicles 20), and each of the vehicles 20 may include respective camera systems 30-1, 30-2 (collectively referred to as camera systems 30), electronic control modules 40-1, 40-2 (collectively referred to as electronic control modules 40), and vehicle interfaces 50-1, 50-2 (collectively referred to as vehicle interfaces 50). The roadway system 10 may also include various traffic signs, such as a stop sign 60 and a speed limit sign 70.

The vehicles 20 may be configured to perform an object detection algorithm, such as a traffic sign and signal identification algorithm. As an example, the vehicles 20, using the camera systems 30 and the electronic control modules 40, may be configured to capture images of surrounding objects located on the roadway system 10 and determine what type of object is located in the image. As a more specific example, the camera system 30-1 may be configured to capture an image of the stop sign 60, and based on the image data, the electronic control module 40-1 is configured to determine that the camera system 30-1 detected the stop sign 60. As another specific example, the camera system 30-2 may be configured to capture an image of the speed limit sign 70, and based on the image data, the electronic control module 40-2 is configured to determine that the camera system 30-2 detected the speed limit sign 70. Additionally or alternatively, the electronic control modules 40 may receive signals from other sensor systems in order to perform the object detection algorithm, such as a radar system, a sonar system, an ultrasonic system, a DSRC system, and/or a LIDAR system.

In order to execute the traffic sign and signal identification algorithm, the electronic control modules 40 may execute various machine learning algorithms using a plurality of cascaded layers that process image data for feature extraction and transformation, such as a convolutional neural network or a deep learning network, as described below in further detail with reference to FIG. 3.

The vehicle interfaces 50 are configured to provide a communication link between the camera systems 30 and the electronic control modules 40. As an example, the vehicle interfaces 50 may include a controller area network (CAN) bus for communication between the camera systems 30 and the electronic control modules 40. Alternatively, the vehicle interfaces 50 may include a lower data rate communication bus interface, such as local interconnect network (LIN) and/or a clock extension peripheral interface (CXPI) bus for communication between the camera systems 30 and the electronic control modules 40. In other embodiments, the vehicle interfaces 50 can include a combination of the CAN bus, LIN, and CXPI bus communication interfaces. In other embodiments, the vehicle interfaces 50 may be implemented by any suitable communication bus interface for an Ethernet local area network (LAN), such as a twisted pair cable or a fiber optic cable. In other embodiment, the vehicle interfaces 50 may be implemented by any suitable telemetric communication link of a wireless local area network (WLAN), such as a Wi-Fi communication link.

In response to the electronic control module 40 receiving signals from the camera systems 30, the electronic control module 40 may be configured to execute various algorithms, such as the traffic sign and signal identification algorithm. Additionally, the electronic control module 40 may be configured to activate or deactivate various control modules of the vehicle 20 based on a type of sign identified by the electronic control module 40, as described below in further detail with reference to FIG. 3.

Figure 2:
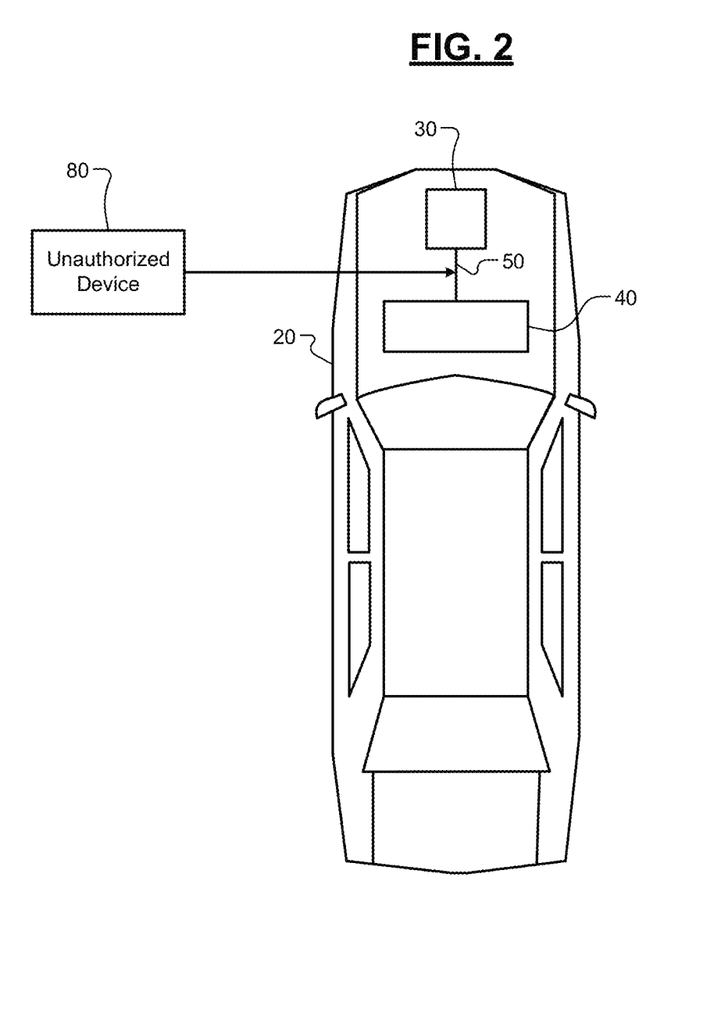
FIG. 2 illustrates a vehicle and an unauthorized device according to the present disclosure.

With reference to FIG. 2, an illustration of the vehicle 20 and an unauthorized device 80 is shown. In one embodiment, a user may attack the vehicle 20 using the unauthorized device 80. As an example, a user may attack the vehicle 20 by connecting the unauthorized device 80 to the vehicle's on-board diagnostics (OBD-II) port. Using the unauthorized device 80, the user may manipulate signals of and/or inject malicious signals into the vehicle interface 50 of the vehicle 20, thereby impairing the functionality of, for example, the traffic sign and signal identification algorithm.

As another example, the user may attack the vehicle 20 via a compact-disc (CD) player and/or other pass-through devices of the vehicle. Specifically, the user may insert the unauthorized device 80, which may be a CD, into a CD player of a vehicle 20. Moreover, the unauthorized device 80 may include instructions that discretely inject malicious signals into the vehicle interface 50 of the vehicle 20 while executing, for example, a windows media audio (WMA) or a moving picture experts group layer-3 audio (MP3) file of the unauthorized device 80.

Additionally, the vehicle 20 may include wireless vulnerabilities that expose it to malicious attacks from the unauthorized device 80. As an example, the unauthorized device 80 may exploit wireless vulnerabilities by performing, for example, passive eavesdropping functions, man-in-the-middle (MITM) attacks, and identity tracking functions of various telemetric links of the vehicle 20. By exploiting these wireless vulnerabilities, the unauthorized device 80 may inject malicious signals into the vehicle 20.

In some embodiments, the electronic control module 40 includes a training database that the convolutional neural networks or deep learning networks reference when executing the machine learning algorithms. Accordingly, the injection of malicious signals into the vehicle interface 50 may manipulate entries of the training database and thereby affect the functionality of the traffic sign and signal identification algorithm. As a specific example, malicious signals may cause the convolutional neural network or deep learning network to determine that the camera system 30 has detected the speed limit sign 70 when the image corresponds to the stop sign 60.

Figure 3:
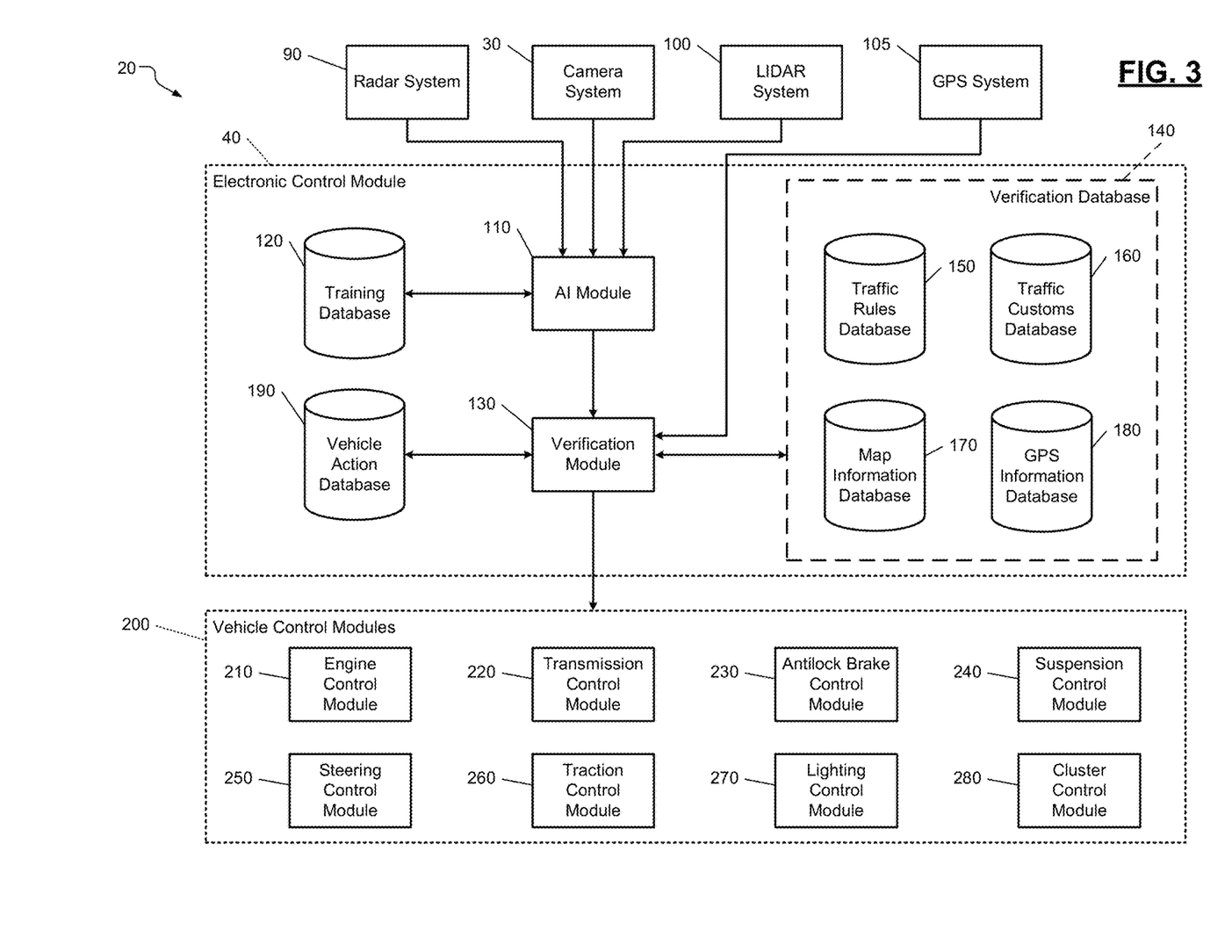
FIG. 3 illustrates a block diagram of a vehicle according to the present disclosure.

With reference to FIG. 3, a block diagram of the vehicle 20 is shown. In one embodiment, the electronic control module 40 includes an artificial intelligence (AI) module 110, which may be implemented by one or more processors that are configured to execute instructions stored in a non-transitory memory, such as a random-access memory (RAM) and/or a read-only memory (ROM). The AI module 110 is configured to execute various machine learning algorithms using a plurality of cascaded layers that process image data obtained by the camera system 30 for feature extraction and transformation. Based on the multiple levels of processing performed by the successive layers, the AI module 110 is configured to generate high-level abstractions of image data. Based on the high-level abstractions, the AI module 110 may execute the traffic sign and signal identification algorithm described above. The AI module 110 may be a deep neural network, a deep convolutional neural network, a deep belief network, a long short-term memory (LSTM) recurrent neural network, or other similar deep learning network.

Successive layers of the AI module 110 may use the output from a previous layer as an input, and each of the layers of the AI module 110 may be configured to perform nonlinear processing on the image data. The successive layers of the AI module 110 may include a filtering layer that is configured to perform a convolution operation on the image (i.e., a convolutional layer); a pooling layer that is configured to determine a maximum value from a set of image data; a normalization layer that is configured to convert the value of each parameter to zero in response to the value of the parameter being less than zero; a logistic regression layer; and other similar nonlinear filtering layers.

The AI module 110 may include nonlinear processing elements that are configured to perform additional processing on the outputs of the AI module 110 and/or linear processing elements of the AI module 110, such as an activation function, a sigmoid function, an inverse tangent function, and other similar functions. The linear processing elements are additional layers that are configured to perform additional processing on the outputs of the AI module 110 and/or the nonlinear processing elements, such as a summing element and a multiplication element.

The AI module 110 may be trained to perform image detection and object identification. As an example, one may train the AI module 110 by performing supervised training on the AI module 110. Specifically, one may tag an image with a set of default parameters corresponding to edges, lines, position, orientation, scale, lighting conditions, defect conditions, and weather conditions of the image and/or traffic signs/signals of the image. The tagged images and corresponding default parameters may be stored in a training database 120. The AI module 110 then processes the inputs to generate a set of test parameters. The set of test parameters may then be compared to the set of default parameters to generate an error. The error may then be propagated back to the AI module 110 (i.e., backpropagation), thereby causing the AI module 110 to adjust the weights of the connections of the AI module 110 and/or between the AI module 110, the nonlinear processing elements, and the linear processing elements. Once the error is below a predetermined threshold, the AI module 110 is trained. Additionally or alternatively, the AI module 110 may be trained using unsupervised training, wherein the AI module 110 processes an image and determines the set of parameters associated with the image and/or weight of the connections based on multiple iterations of test parameters generated for the image.

As described above, decreasing the error improves the accuracy of the AI module 110. Additionally, the accuracy of the AI module 110 may be improved by adjusting the weight of the connections and/or introducing noise during the training in order to avoid overfitting. As another example, as more images are inputted during the supervised and/or unsupervised training, the AI module 110 is configured to improve its accuracy with respect to object detection.

Once the AI module 110 is trained, the AI module 110 is configured to perform the traffic sign and signal identification algorithm in response to receiving image data from the camera system 30. As an example, if the image data corresponds to a presence of the stop sign 60, the AI module 110 is configured to, based on the training information stored in the training database 120, determine that the camera system 30 has detected the stop sign 60. In addition to obtaining image data from the camera system 30, the AI module 110 may use measurements obtained by at least one of a radar system 90 and a LIDAR system 100 in order to perform the traffic sign and signal identification algorithm.

A verification module 130 is configured to verify that the AI module 110 correctly performed the traffic sign and signal identification algorithm. In one embodiment, the AI module 110 may incorrectly perform the traffic sign and signal identification algorithm if the training database 120 and/or AI module 110 were subjected to a malicious attack from the unauthorized device 80. Accordingly, the verification module 130 may receive a signal corresponding to the determined traffic sign and execute a comparison algorithm based on the determined traffic sign or signal and a plurality of entries in a verification database 140, which may be implemented by a traffic rules database 150, a traffic customs database 160, a map information database 170, and a GPS information database 180. Additionally, the verification module 130 may receive location data from a GPS system 105 and subsequently execute the comparison algorithm based on the location data, the determined traffic sign or signal, and the plurality of entries in the verification database 140, as described below in further detail. Example comparison algorithms are described below with reference to FIGS. 4-5. In order to carry out the functionality described herein, the verification module 130 may be implemented by one or more processors that are configured to execute instructions stored in a nontransitory memory, such as a random-access memory (RAM) and/or a read-only memory (ROM).

The GPS system 105 is configured to receive positioning and time information from a GPS satellite and subsequently generate signals representing the position and/or time data associated with the vehicle 20 and/or image data obtained by the vehicle 20. Based on the signals representing the position and/or time data, the GPS system 105 is configured to generate location data (e.g., GPS coordinates) associated with the vehicle 20 and/or image data obtained by the vehicle 20. In response to receive the location data from the GPS system 105, the verification module 130 may be configured to determine whether the determined traffic sign or signal and the location data are associated with an entry in at least one of the map information database 170 and the GPS information database 180. The map information database 170 may include a plurality of entries corresponding to known traffic signs used at various locations. As an example, the map information database 170 may include an entry corresponding to a first intersection and known traffic signs at the first intersection. The GPS information database 180 may include a plurality of entries corresponding to known traffic signs used at various GPS coordinates. As an example, the GPS information database 180 may include an entry corresponding to a first set of GPS coordinates and known traffic signs associated with the first set of GPS coordinates. Determining whether the determined traffic sign or signal matches an entry of the map information database 170 or the GPS information database 180 is described below in further detail with reference to FIGS. 4-5.

The traffic rules database 150 may include a plurality of entries corresponding to traffic rules associated with various signs. As an example, an entry associated with the stop sign 60 may include information indicating that the stop sign 60 must be red, have white letters, and have eight sides. Additionally, another entry associated with the stop sign 60 may include information indicating that the vehicle 20 must come to a complete stop prior to a stop line if the stop line is present. Another entry associated with the stop sign 60 may include information indicating that the vehicle 20 must wait until crossing vehicles and pedestrians have cleared before proceeding. As another example, an entry associated the speed limit sign 70 may include information stating that the sign must be white, have black letters, and be a rectangle. Additionally, another entry associated with the speed limit sign 70 may include information indicating a maximum or minimum vehicle speed in ideal conditions. While the above examples are merely illustrative, the traffic rules database 150 may include entries corresponding to any type of traffic signals or signs, such as warning signs, railroad and light rail transit grade crossing signs, temporary traffic control signs, regulatory signs, mandatory movements signs, guide signs, motorist service and recreation signs, pedestrian and bicycle signs, etc. Determining whether the determined traffic sign or signal matches an entry of the traffic rules database 150 is described below in further detail with reference to FIGS. 4-5.

The traffic customs database 160 may include a plurality of entries corresponding to regional traffic signs, regional traffic customs, and/or user-defined traffic customs. As an example, the traffic customs database 160 may include a first set of entries associated with a state route marker sign used in, for example, Michigan. Specifically, the first set of entries may include identifying information of the sign, a speed limit associated with the corresponding state route, etc. As another example, the traffic customs database 160 may include a second set of entries associated with regional traffic customs, such as a "Pittsburgh Left" that is performed in Southwest Pennsylvania. Specifically, the second set of entries may include information corresponding to various traffic signs used at intersections in Southwest Pennsylvania and instructions for properly and safely executing the "Pittsburgh Left". As another example, the traffic customs database 160 may include a third set of entries corresponding to traffic customs that are defined by, for example, a developer of the electronic control module 40. The developer may define the third set of entries in order to further improve the safety of the traffic sign and signal identification algorithm. As a specific example, the third set of entries may include information corresponding to a rule that the stop sign 60 cannot be located on a highway or locations having a speed limit that is greater than a threshold speed. As another specific example, the third set of entries may also include information corresponding to a rule that the speed limit sign 70 cannot have a value that is greater than 25 mph in residential locations. Determining whether the determined traffic sign or signal matches an entry of the traffic customs database 150 is described below in further detail with reference to FIGS. 4-5.

In response to the comparison algorithm determining that AI module 110 correctly identified traffic sign based on the information in the verification database 140, the verification module 130 may identify a vehicle action entry stored in a vehicle action database 190 that is associated with the identified traffic sign. As an example, a vehicle action entry associated with the stop sign 60 may include instructions for slowing down the vehicle 20 until it has reached a complete stop. Based on the identified vehicle action, the verification module 130 may output a signal to a vehicle control module 200, which may include an engine control module 210, a transmission control module 220, an antilock brake control module 230, a suspension control module 240, a steering control module 250, a traction control module 260, a lighting control module 270, and a cluster control module 280. As an example, in response to the signal indicating that the vehicle action entry is associated with the stop sign 60, the verification module 130 may communicate a signal to the engine control module 210 or the antilock brake control module 230 with instructions to slow down an engine of the vehicle 20 or to activate a braking system of the vehicle 20 to slow down the vehicle 20. In alternative embodiments, the verification module 130 may output a signal to the vehicle control module 200 based on vehicle metrics obtained by various sensors of the vehicle 20, such as a sensor of the radar system 90 and/or the LIDAR system 100, infrared sensors, speed sensors, torque sensors, etc. Accordingly, at least one of the engine control module 210, the transmission control module 220, the antilock brake control module 230, the suspension control module 240, the steering control module 250, the traction control module 260, the lighting control module 270, and the cluster control module 280 may be activated based on the information in the signal.

In response to the comparison algorithm determining that AI module 110 incorrectly identified traffic sign, the verification module 130 may output a signal to the cluster control module 280, and the signal may instruct an instrument cluster of the vehicle 20 to display an alert corresponding to the misidentification. Furthermore, the alert may indicate to the operator of the vehicle 20 that the AI module 110 and/or the training database 120 were subjected to a malicious attack from or tampered with by the unauthorized device 80. Additionally, the alert may indicate to the operator that the vehicle 20 is deactivating at least a portion of the autonomous functions of the vehicle 20 until a technician has serviced the AI module 110 and/or the training database 120.

Figure 4:
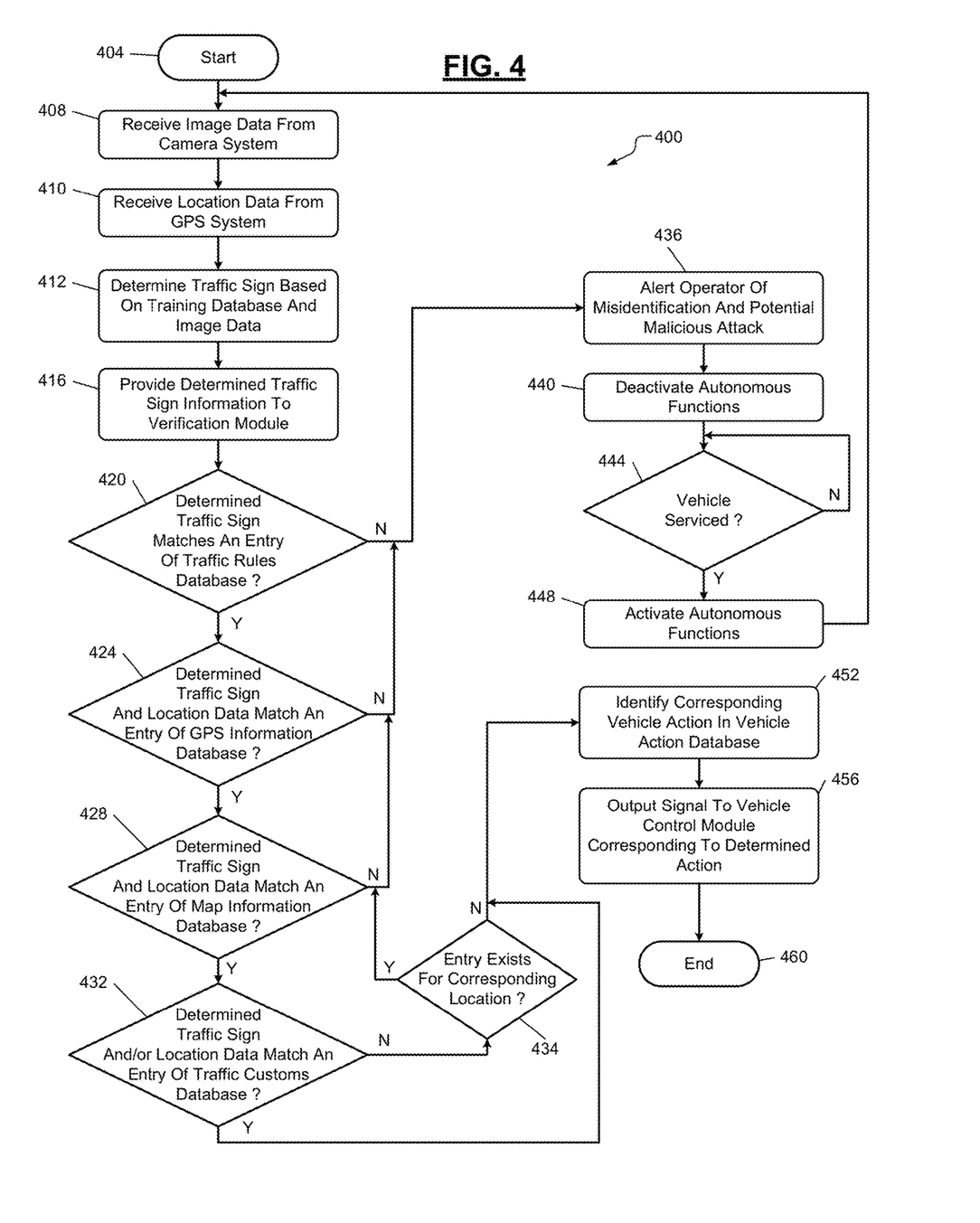
FIG. 4 illustrates a flowchart of an example control algorithm according to the present disclosure.

With reference to FIG. 4, a flowchart of an example control algorithm 400 is shown. The control algorithm 400 starts at 404 when, for example, the vehicle 20 is turned on. At 408, the control algorithm 400 receives, using the AI module 110, image data from the camera system 30. Additionally, the AI module 110 may receive sensor data from the radar system 90 and/or the LIDAR system 100. At 410, the control algorithm 400 receives, using the verification module 130, location data from the GPS system 105. At 412, the control algorithm 400 determines, using the AI module 110, the type of traffic sign based on the training database 120 and the image data. At 416, the control algorithm 400 provides, using the AI module 110, the determined traffic sign information to the verification module 130.

At 420, the control algorithm 400 determines, using the verification module 130, whether the determined traffic sign matches an entry of the traffic rules database 150. As an example, if the determined traffic sign is the stop sign 60, the verification module 130 may determine that the stop sign 60 matches an entry of the traffic rules database 150 if the corresponding image data matches an entry that includes information indicating that the stop sign 60 is red, has white letters, and has eight sides. If the determined traffic sign matches the identified entries of the traffic rules database 150, the control algorithm 400 proceeds to 424; otherwise, the control algorithm 400 proceeds to 436.

At 424, the control algorithm 400 determines, using the verification module 130, whether the determined traffic sign and the corresponding location data match an entry of the GPS information database 180. As an example, if the determined traffic sign is the stop sign 60, the verification module 130 may determine that the stop sign 60 matches an entry of the GPS information database 180 if the GPS coordinates of the vehicle 20 matches an entry that includes the GPS coordinates and information associated with the stop sign 60. If the determined traffic sign and location data match one of the identified entries of the GPS information database 180, the control algorithm 400 proceeds to 428; otherwise, the control algorithm 400 proceeds to 436.

At 428, the control algorithm 400 determines, using the verification module 130, whether the determined traffic sign and the location data match an entry of the map information database 170. As an example, if the determined sign is the stop sign 60, the verification module 130 may determine that the stop sign 60 matches an entry of the map information database 170 if the location of the vehicle 20 (e.g., location data indicates the vehicle 20 is at an intersection) matches an entry that includes information associated with the same location and the stop sign 60. If the determined traffic sign and the location data match one of the identified entries of the map information database 170, the control algorithm 400 proceeds to 432; otherwise, the control algorithm 400 proceeds to 436.

At 432, the control algorithm 400 determines, using the verification module 130, whether the determined traffic sign and/or location data match an entry of the traffic customs database 160. As an example, if the determined sign is the stop sign 60, the verification module 130 may determine that the stop sign 60 matches an entry of the traffic customs database 160 if the location of the vehicle 20 (e.g., location data indicates the vehicle 20 is in a first city) matches an entry that includes the same location, a user-defined traffic custom, and information associated with the stop sign 60. If the determined traffic sign and/or location data match one of the identified entries of the traffic customs database 160, the control algorithm 400 proceeds to 452; otherwise, the control algorithm 400 proceeds to 434.

At 434, the control algorithm 400 determines, using the verification module 130, whether an entry for the corresponding to the location of the vehicle 20 exists. As an example, certain locations may not include any traffic customs. Accordingly, in response to a determination that the determined traffic sign does not match an entry of the traffic customs database 160, as described above, the verification module 130 may effectively disregard this determination if an entry does not exist corresponding to the location of the vehicle 20. If an entry for the corresponding to the location of the vehicle 20 exists, the control algorithm 400 proceeds to 436; otherwise, the control algorithm 400 proceeds to 452.

At 436, the control algorithm 400 alerts, using the verification module 130, the operator of the vehicle 20 of the traffic sign misidentification and/or of a potential malicious attack on the vehicle 20, as described above. At 440, the control algorithm 400 deactivates, using the electronic control module 40, the autonomous functions of the vehicle 20. At 444, the control algorithm 400 determines, using the electronic control module 40, whether the vehicle 20 has been serviced by a technician. As an example, the technician may service the vehicle 20 in order to remove the malicious signals injected into the vehicle 20 that have manipulated and/or modified the AI module 110 and/or the training database 120. If so, the control algorithm 400 proceeds to 448; otherwise, the control algorithm 400 remains at 444 until the vehicle 20 has been serviced. At 448, the control algorithm 400 activates, using the electronic control module 40, the autonomous functions of the vehicle 20 and proceeds to 408.

At 452, the control algorithm 400 identifies, using the verification module 130, a corresponding vehicle action in the vehicle action database 190 based on the determined sign. At 456, the control algorithm 400 outputs, using the verification module 130, a signal to the vehicle control module 200 corresponding to the determined vehicle action.

As an example, in response to the signal indicating that the vehicle action is associated with the stop sign 60, the verification module 130 may communicate a signal to the engine control module 210 or the antilock brake control module 230 with instructions to slow down the engine of the vehicle 20 or to activate the braking system of the vehicle 20 to slow down the vehicle 20. In alternative embodiments, the verification module 130 may output a signal to the vehicle control module 200 based on vehicle metrics obtained by various sensors of the vehicle 20. At 460, the control algorithm 400 ends.

Figure 5:
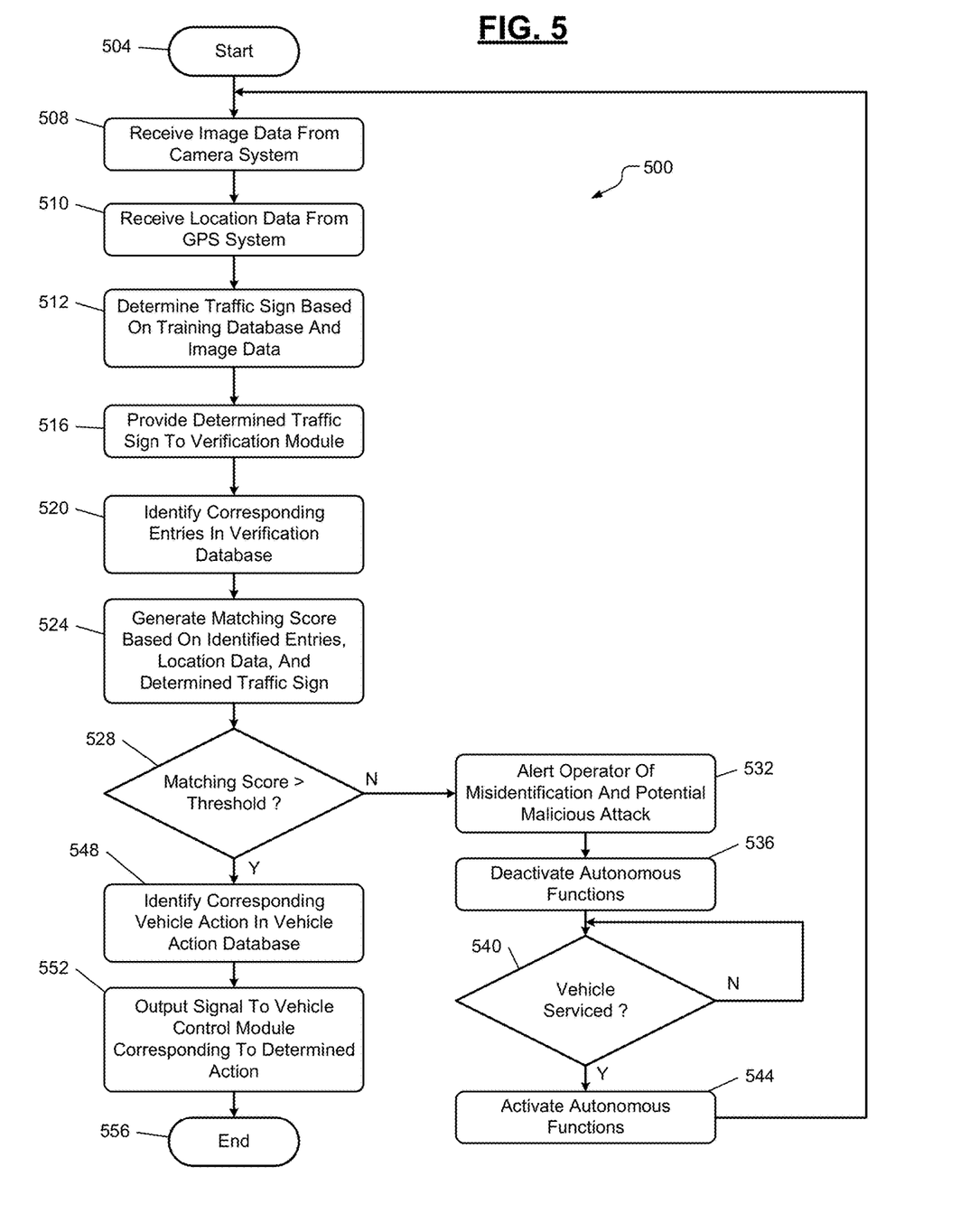
FIG. 5 illustrates a flowchart of another example control algorithm according to the present disclosure.

With reference to FIG. 5, a flowchart of an example control algorithm 500 is shown. The control algorithm 500 starts at 504 when, for example, the vehicle 20 is turned on. At 508, the control algorithm 500 receives, using the AI module 110, image data from the camera system 30. Additionally, the AI module 110 may receive sensor data from the radar system 90 and/or the LIDAR system 100. At 510, the control algorithm 400 receives, using the verification module 130, location data from the GPS system 105. At 512, the control algorithm 500 determines, using the AI module 110, the type of traffic sign based on the training database 120 and the image data. At 516, the control algorithm 500 provides, using the AI module 110, the determined traffic sign information to the verification module 130. At 520, the control algorithm 500 identifies, using the verification module 130, entries in the verification database 140 corresponding to the determined traffic sign.

At 524, the control algorithm 500 generates, using the verification module 130, a matching score based on the identified entries of the verification database 140 and the determined traffic sign. The matching score may be based on a degree of matching between the determined traffic sign and/or location data and at least a portion of the entries of the verification database 140. As an example, the degree of matching may be based on a character-based matching (e.g., text matching, numerical matching, etc.) between (i) the determined traffic sign, characteristics of the image data, and/or location data and (ii) entries of the verification database 140. In one embodiment, the matching score may be higher when the determined traffic sign matches a larger amount of identified entries of the verification database 140, while the matching score may be lower when the determined traffic sign matches a lower amount of identified entries of the verification database 140. In some embodiments, matching an entry in a first database of the verification database 140 (e.g., the traffic rules database 150) may be given a greater weight compared to an entry of a second database of the verification database 140 (e.g., the traffic customs database 160) with respect to determining the matching score. Alternatively, matching an entry in the first database of the verification database 140 may have the same weight as an entry of the second database of the verification database 140.

At 528, the control algorithm 500 determines whether the matching score is greater than a threshold value. As an example, the threshold value may be indicative of the AI module 110 correctly determining the traffic sign. If so, the control algorithm 500 proceeds to 548; otherwise, the control algorithm 500 proceeds to 532. At 532, the control algorithm 500 alerts, using the verification module 130, the operator of the vehicle 20 of the traffic sign misidentification and/or of a potential malicious attack on the vehicle 20. At 536, the control algorithm 500 deactivates, using the electronic control module 40, the autonomous functions of the vehicle 20. At 540, the control algorithm 500 determines, using the electronic control module 40, whether the vehicle 20 has been serviced by a technician. As an example, the technician may service the vehicle 20 in order to remove the malicious signals injected into the vehicle 20 that have manipulated and/or modified the AI module 110 and/or the training database 120. If so, the control algorithm 500 proceeds to 544; otherwise, the control algorithm 500 remains at 540 until the vehicle 20 has been serviced. At 544, the control algorithm 500 activates, using the electronic control module 40, the autonomous functions of the vehicle 20 and proceeds to 508.

At 548, the control algorithm 500 identifies, using the verification module 130, a corresponding vehicle action in the vehicle action database 190 based on the determined sign. At 552, the control algorithm 500 outputs, using the verification module 130, a signal to the vehicle control module 200 corresponding to the determined vehicle action. As an example, in response to the signal indicating that the vehicle action entry is associated with the stop sign 60, the verification module 130 may communicate a signal to the engine control module 210 or the antilock brake control module 230 with instructions to slow down the engine of the vehicle 20 or to activate the braking system of the vehicle 20 to slow down the vehicle 20. In alternative embodiments, the verification module 130 may output a signal to the vehicle control module 200 based on vehicle metrics obtained by various sensors of the vehicle 20. At 556, the control algorithm 500 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
receiving, using an electronic control module of a vehicle, image data from a camera system, wherein the electronic control module includes at least one processor that is configured to execute instructions stored in a nontransitory medium;
determining, using the electronic control module, an identification of a traffic sign based on the image data and information from a training database;
determining, using the electronic control module, a location of the traffic sign using a global positioning system (GPS);
determining, using the electronic control module, whether the identification of the traffic sign is correct based on a matching of the traffic sign with an entry in a traffic rules database that stores physical characteristics of the traffic sign, and an entry in a GPS information database that stores known traffic signs with associated GPS coordinates;

in response to determining that the identification of the traffic sign is correct, identifying, with the electronic control module, a vehicle action from a vehicle action database corresponding to the traffic sign and outputting, with the electronic control module, a signal to a vehicle control module to control the vehicle according to the vehicle action; and in response to determining that the identification of the traffic sign is incorrect, (i) deactivating, with the electronic control module, at least a portion of autonomous functions of the vehicle until the vehicle is serviced, and (ii) generating, with the electronic control module, an alert to an operator of the vehicle that the identification of the traffic sign is incorrect, that at least the portion of autonomous functions of the vehicle have been deactivated until the vehicle is serviced, and that the vehicle has been modified by a malicious attack from an unauthorized device.

2. The method of claim 1, wherein in response to the vehicle being serviced based on a modification by the unauthorized device, activating at least the portion of the autonomous functions of the vehicle.

3. The method of claim 1, wherein the signal is configured to activate at least one of an engine control module, a transmission control module, an antilock brake control module, a suspension control module, a steering control module, a traction control module, a lighting control module, and a cluster control module.

4. The method of claim 1, wherein the electronic control module is configured to execute various machine learning algorithms using a plurality of cascaded layers that process image data obtained by the camera system.

5. The method of claim 1, wherein matching the traffic sign with the entry in the traffic rules database further comprises:
  comparing image data to information of the entry indicating the physical characteristics of the traffic sign; and
  in response to the image data matching each of the physical characteristics of the traffic sign, determining that the traffic sign matches the entry in the traffic rules database.

6. The method of claim 1, further comprising:
  obtaining location information associated with the vehicle;
  determining whether an entry exists in a traffic customs database corresponding to the location information; and
  in response to determining that the entry in the traffic customs database corresponding to the location information exists, determining whether the entry in the traffic customs database indicates that the traffic sign is a regional traffic sign;
  wherein the electronic control module determines whether the identification of the traffic sign is correct based on whether the entry in the traffic customs database indicates that the traffic sign is the regional traffic sign.

7. The method of claim 1, further comprising matching the traffic sign with an entry in a map information database by:
  obtaining location information associated with the vehicle;
  identifying the entry of the map information database corresponding to the location information; and
  determining whether the identified entry indicates that the traffic sign is associated with the location information;

wherein the electronic control module determines whether the identification of the traffic sign is correct based on whether the identified entry indicates that the traffic sign is associated with the location information.

8. The method of claim 1, wherein matching the traffic sign with the entry in the GPS information database comprises:
  obtaining GPS coordinates associated with the vehicle;
  identifying the entry of the GPS information database corresponding to the GPS coordinates; and
  determining whether the identified entry indicates that the traffic sign is associated with the GPS coordinates.

9. A system comprising:
  an electronic control module of a vehicle, wherein the electronic control module includes at least one processor that is configured to execute instructions stored in a nontransitory medium, and the instructions include:
    receiving, using the electronic control module, image data from a camera system;
    determining, using the electronic control module, an identification of a traffic sign based on the image data and information from a training database;
    determining, using the electronic control module, a location of the traffic sign using a global positioning system (GPS);
    determining, using the electronic control module, whether the identification of the traffic sign is correct based on a matching of the traffic sign with an entry in a traffic rules database that stores physical characteristics of the traffic sign, and an entry in a GPS information database that stores known traffic signs with associated GPS coordinates;
    in response to determining that the identification of the traffic sign is correct, identifying, with the electronic control module, a vehicle action from a vehicle action database corresponding to the traffic sign and outputting, with the electronic control module, a signal to a vehicle control module to control the vehicle according to the vehicle action; and
    in response to determining that the identification of the traffic sign is incorrect, (i) deactivating, with the electronic control module, at least a portion of autonomous functions of the vehicle until the vehicle is serviced, and (ii) generating, with the electronic control module, an alert to an operator of the vehicle that the identification of the traffic sign is incorrect, that at least the portion of autonomous functions of the vehicle have been deactivated until the vehicle is serviced, and that the vehicle has been modified by a malicious attack from an unauthorized device.

10. The system of claim 9, wherein the instructions further comprise:
  in response to the vehicle being serviced based on a modification by the unauthorized device, activating at least the portion of the autonomous functions of the vehicle.

11. The system of claim 9, wherein the signal is configured to activate at least one of an engine control module, a transmission control module, an antilock brake control module, a suspension control module, a steering control module, a traction control module, a lighting control module, and a cluster control module.

12. The system of claim 9, wherein the electronic control module is configured to execute various machine learning algorithms using a plurality of cascaded layers that process image data obtained by the camera system.

13. The system of claim 9, wherein matching the traffic sign with the entry in the traffic rules database further comprises:
- comparing image data to information of the entry indicating the physical characteristics of the traffic sign; and
- in response to the image data matching each of the physical characteristics of the traffic sign, determining that the traffic sign matches the entry in the traffic rules database.

14. The system of claim 9, wherein the instructions further comprise:
- obtaining location information associated with the vehicle;
- determining whether an entry exists in a traffic customs database corresponding to the location information; and
- in response to determining that the entry in the traffic customs database corresponding to the location information exists, determining whether the entry in the traffic customs database indicates that the traffic sign is a regional traffic sign;
- wherein the electronic control module determines whether the identification of the traffic sign is correct based on whether the entry in the traffic customs database indicates that the traffic sign is the regional traffic sign.

15. The system of claim 9, wherein the instructions further comprise matching the traffic sign with an entry in a map information database by:
- obtaining location information associated with the vehicle;
- identifying the entry of the map information database corresponding to the location information; and
- determining whether the identified entry indicates that the traffic sign is associated with the location information;
- wherein the electronic control module determines whether the identification of the traffic sign is correct based on whether the identified entry indicates that the traffic sign is associated with the location information.

16. The system of claim 9, wherein matching the traffic sign with the entry in the GPS information database comprises:
- obtaining GPS coordinates associated with the vehicle;
- identifying the entry of the GPS information database corresponding to the GPS coordinates; and
- determining whether the identified entry indicates that the traffic sign is associated with the GPS coordinates.

* * * * *

UNITED STATES PATENT AND TRADEMARK OFFICE
CERTIFICATE OF CORRECTION

PATENT NO. : 10,783,389 B2
APPLICATION NO. : 16/052806
DATED : September 22, 2020
INVENTOR(S) : Satoshi Nagao et al.

It is certified that error appears in the above-identified patent and that said Letters Patent is hereby corrected as shown below:

In the Claims

Column 15, Line 61: In Claim 7, delete "by :" and insert --by:-- therefor

Signed and Sealed this
Seventeenth Day of November, 2020

Andrei Iancu
*Director of the United States Patent and Trademark Office*